United States Patent [19]

Foreman et al.

[11] Patent Number: 5,387,131
[45] Date of Patent: Feb. 7, 1995

[54] NETWORK CONDITIONING INSERT

[75] Inventors: Kevin G. Foreman, Sandia Park; Sean M. Rieb; Paul J. Miller, both of Albuquerque, all of N. Mex.

[73] Assignee: TRW Inc., Redondo Beach, Calif.

[21] Appl. No.: 54,658

[22] Filed: Apr. 23, 1993

Related U.S. Application Data

[63] Continuation-in-part of Ser. No. 938,111, Aug. 31, 1992, Pat. No. 5,290,191, which is a continuation-in-part of Ser. No. 895,148, Jun. 5, 1992, Pat. No. 5,181,859, which is a continuation of Ser. No. 694,262, Apr. 29, 1991, abandoned.

[51] Int. Cl.6 .......................................... H01R 13/703
[52] U.S. Cl. .................................... 439/620; 439/496
[58] Field of Search ............... 439/620, 496, 497, 495, 439/676, 225

[56] References Cited

U.S. PATENT DOCUMENTS

| | | |
|---|---|---|
| T947,007 | 6/1975 | Krumreich et al. . |
| 2,073,880 | 3/1937 | Robinson . |
| 2,760,128 | 8/1956 | Colby . |
| 2,944,330 | 7/1960 | Swick . |
| 3,072,873 | 1/1963 | Traher . |
| 3,500,194 | 3/1970 | Smith . |
| 3,569,915 | 3/1971 | Langham et al. . |
| 3,670,292 | 6/1972 | Tracy . |
| 3,736,379 | 5/1973 | Kagan . |
| 3,744,001 | 7/1973 | Schor ............................ 439/620 X |
| 3,753,261 | 6/1973 | Thaxton . |
| 3,825,874 | 7/1974 | Peverill . |
| 3,852,700 | 12/1974 | Haws . |
| 3,905,013 | 9/1975 | Lee . |
| 4,002,397 | 1/1977 | Wang et al. . |
| 4,056,299 | 11/1977 | Paige . |
| 4,082,394 | 4/1978 | Gedney et al. . |
| 4,326,765 | 4/1982 | Brancaleone . |
| 4,362,350 | 12/1982 | von Harz . |
| 4,407,552 | 10/1983 | Watanabe et al. . |
| 4,415,218 | 11/1983 | McKenzie . |
| 4,440,463 | 4/1984 | Gliha, Jr. et al. . |
| 4,522,455 | 6/1985 | Johnson . |
| 4,673,237 | 6/1987 | Wadsworth . |
| 4,676,584 | 6/1987 | Mitchell, Jr. . |
| 4,714,435 | 12/1987 | Stipanuk et al. ................ 439/620 X |
| 4,717,349 | 1/1988 | Johnson . |
| 4,778,410 | 10/1988 | Tanaka ............................... 437/676 |
| 4,813,891 | 3/1989 | Walters et al. . |
| 4,820,174 | 4/1989 | Farrar et al. . |
| 4,846,705 | 7/1989 | Brunnenmeyer . |
| 4,979,070 | 12/1990 | Bodkin . |
| 4,979,904 | 12/1990 | Francis . |
| 4,992,061 | 2/1991 | Brush et al. ......................... 439/620 |
| 4,992,333 | 2/1991 | Hyatt . |
| 5,092,788 | 3/1992 | Pristupa, Jr. et al. . |
| 5,118,302 | 6/1992 | Fussell et al. . |
| 5,134,252 | 7/1992 | Himono et al. . |
| 5,181,859 | 1/1993 | Foreman et al. . |
| 5,183,698 | 2/1993 | Stephenson et al. . |
| 5,269,705 | 12/1993 | Iannella et al. ..................... 439/620 |

OTHER PUBLICATIONS

Archer, "Heavy Duty Spike Protector", (Ex. A).
Pulse-Guard "Transient Overvoltage Protection", 1 p., date believed to be Mar. 1992. (Ex. C).
Hyatt, "A Technique for Optimizing EDS, EMP and Lighting Protection", pp. 393-08, date believed to be fall 1992. (Ex. B).
G&H Technology, Inc., "Pulse-Guard" literature including Sub-Millimeter model, 10 sheets, date believed to be Aug. 1992 (Ex. D).

(List continued on next page.)

*Primary Examiner*—Eugene F. Desmond
*Attorney, Agent, or Firm*—G. Gregory Schivley; Robert W. Keller

[57] ABSTRACT

A signal conditioning insert device that is particularly suited for use as a small computer system interface (SCSI) terminator. The device is in the form of an elongated U-shaped member that is capable of being sandwiched between two electrical connectors. The substrate has a series of contact strips thereon which engage the contact fingers of the connectors. Conductive traces on the substrate connect the contact strips to components forming a desired signal condition function such as a SCSI terminator circuit.

24 Claims, 5 Drawing Sheets

OTHER PUBLICATIONS

Pulse-Guard "Pulse Guard Model PGD Submillimeter Suppressor Arrays", 2 sheets, date believed to be Oct. 1992 (Ex. F).

Pulse-Guard "The Super ESD Suppressor for I/O Connectors", 4 sheets, date believed to be Feb. 1993 (Ex. G).

"Insert Device for Electrical Relays, Solenoids, Motors, and the Like", filed Jul. 1, 1993.

U.S. Serial No. 07/998,354, filed Dec. 30, 1992.
U.S. Serial No. 07/998,332, filed Dec. 30, 1992.
U.S. Serial No. 07/998,333, filed Dec. 30, 1992.
U.S. Serial No. 07/938,111, filed Aug. 31, 1992.

NETWORK CONDITIONING INSERT

This application is a continuation-in-part of U.S. Ser. No. 938,111, filed Aug. 31, 1992, now U.S. Pat. No. 5,280,191, which is a continuation-in-part of U.S. Ser. No. 895,148, filed Jun. 5, 1992, now U.S. Pat. No. 5,181,859, issued Jan. 26, 1993, which is a continuation of U.S. Ser. No. 694,262, filed Apr. 29, 1991, now abandoned.

BACKGROUND OF THE INVENTION

There are several applications where it would be desirable to add conditioning electronics to cabling used in computer systems. For example, computer networks often need special termination circuitry added to network cabling at various connection points. By way of a non-limiting example, the small computer system interface (SCSI) is a defacto standard for connecting external storage devices to a wide range of computer network systems. One of the SCSI requirements is that each bus be terminated on both ends with predetermined termination circuitry. This circuitry is sometimes located internally in the computer peripheral device. However, one of the most common techniques is to use an external terminator pack that is physically located at the first and last device in the SCSI network. While a variety of terminator packs and techniques for providing SCSI termination are used, one construction consists of a relatively bulky piece of hardware that encloses some electronics on a printed circuit board which, in turn, has two mating connectors on it so that it can be added in series with a SCSI cable.

There are several drawbacks to these techniques for incorporating conditioning devices into electrical systems, in general, and for providing SCSI termination, in particular. The large number of individual and extraneous components used in the prior art methods tend to unduly increase production and distribution costs, as well as taking up valuable space. Many of the terminator packs require an additional set of mating connectors to allow the signals therein to pass through the network. These additional connectors do not provide any significant circuit function, yet they can degrade the radio frequency shielding of the network cables.

Therefore, there exists a need for a simple, low cost, yet reliable technique for conditioning signals on electrical cables and, in particular, to provide a SCSI bus terminator with these improved characteristics.

SUMMARY OF THE INVENTION

The present invention broadly provides a device that generally conforms in shape to electrical connectors of the type having a series of contact fingers which either surround a central elongated insulating post or define inner walls of a receptacle cavity. Centronix brand connectors are one example of connectors of this type. The device has a series of contact strips thereon which are aligned with the connector fingers. The device is inserted into the connector so that the device contact strips make electrical connection with the fingers of the connector. Provision is made for conditioning electrical signals from at least one of the connector fingers. This conditioning can take a wide variety of forms such as routing signals through resistors to connect them into an appropriate SCSI termination network.

In the preferred embodiment, the insert has an elongated U-shaped insulating substrate having a pair of legs spaced by a bridging portion. Inner surfaces of the legs have a series of contact strips thereon aligned with the fingers on one connector. Outer surfaces of the legs also have a series of contact strips which are aligned with the fingers of another mating connector. The substrate is sufficiently thin so that it fits within the small space between the mated connectors, without disturbing the normal connection.

BRIEF DESCRIPTION OF THE DRAWINGS

The various advantages of the present invention will become apparent to those skilled in the art upon reading the following specification and by reference to the drawings in which.

DETAILED DESCRIPTION OF THE PREFERRED EMBODIMENTS

It should be understood from the outset that while this invention will be described in connection with a few particular examples, no limitation is intended thereby except as defined in the claims which follow this detailed description.

The present invention finds particular utility for the use with electrical connectors of the type that employ a series of finger contacts that either surround an elongated insulating post or line the walls defining a cavity in the connector. Connectors of this type are known in the trade by various brand names. Since the Centronix connectors appear to be most prevalent on the marketplace today, we shall refer to the aforementioned types of connectors as Centronix-type connectors.

Figure 1:
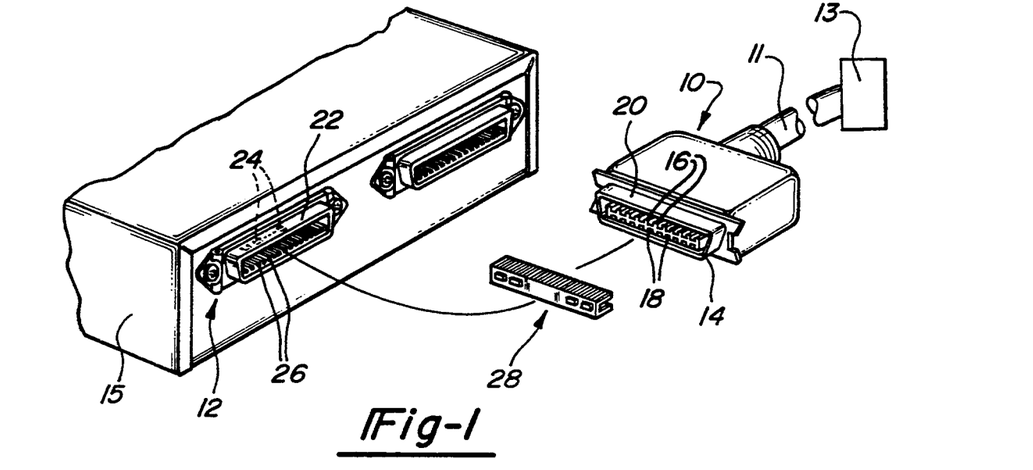
FIG. 1 is an exploded perspective view showing a conditioning insert device made in accordance with the teachings of the present invention, in preparation for use between a cable connector and a connector on a computer peripheral device.

FIG. 1 shows two such Centronix-type connectors 10 and 12. Connector 10 is located at one end of a network cable 11 coupled to host computer 13 while connector 12 is mounted to a computer peripheral device 15 such as a disk drive or the like. Connector 10 has an elongated insulating post 14. A series of flat spring finger contacts 16 lie on an upper edge of post 14, while a similar series of finger contacts 18 lie on a lower edge of post 14. A metal shield 20 surrounds the central post/contact area of connector 10. For purposes of this invention, this type of connector will be referred to as a male Centronix-type connector. In contrast, connector 12, for purposes of this invention, will be referred to as a female Centronix-type connector. It differs from connector 10 in that it includes a protruding annular insulating mouth 22 whose upper inner wall is lined with a first series of spring finger contacts 24 and whose lower inner wall is lined with a second series of spring finger contacts 26. In normal use, connector 10 is mated with connector 12 such that contacts 16 and 18 of connector 10 make wiping electrical connection with contacts 24 and 26, respectively, of connector 12.

The reader's attention should now be drawn to the conditioning insert device 28 which is the subject of the present invention.

Figure 2:
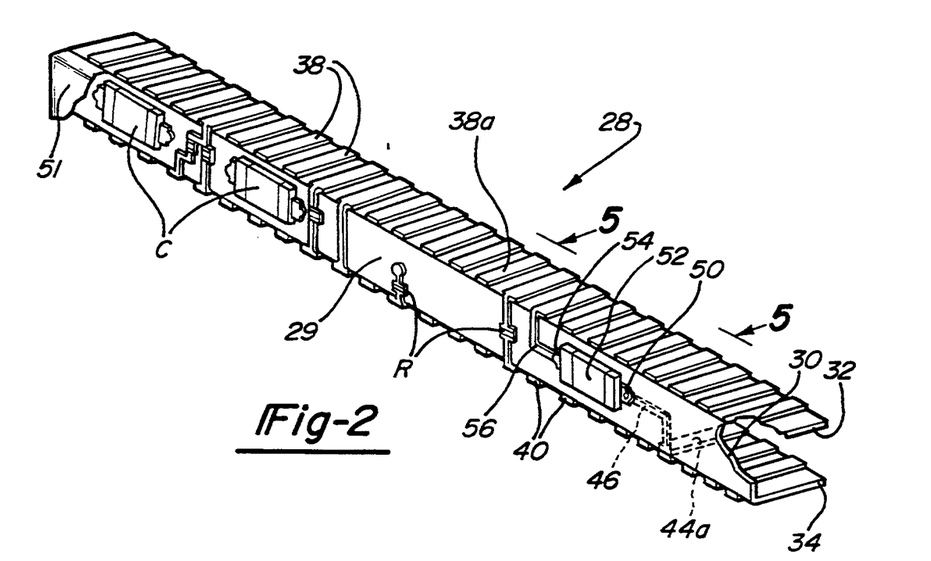
FIG. 2 is an enlarged perspective view, with parts cut away, of one embodiment of the conditioning insert device.
Figure 3:
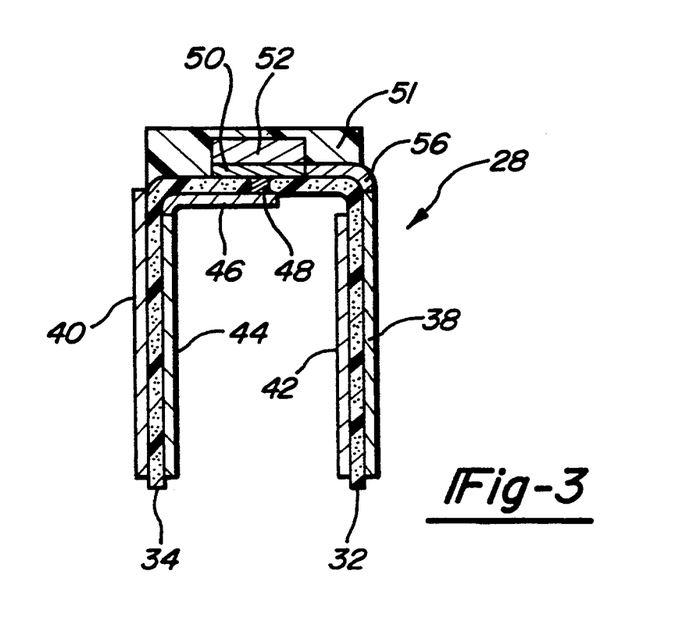
FIG. 3 is a cross sectional view taken along the lines 3—3 of FIG. 5.
Figure 4:
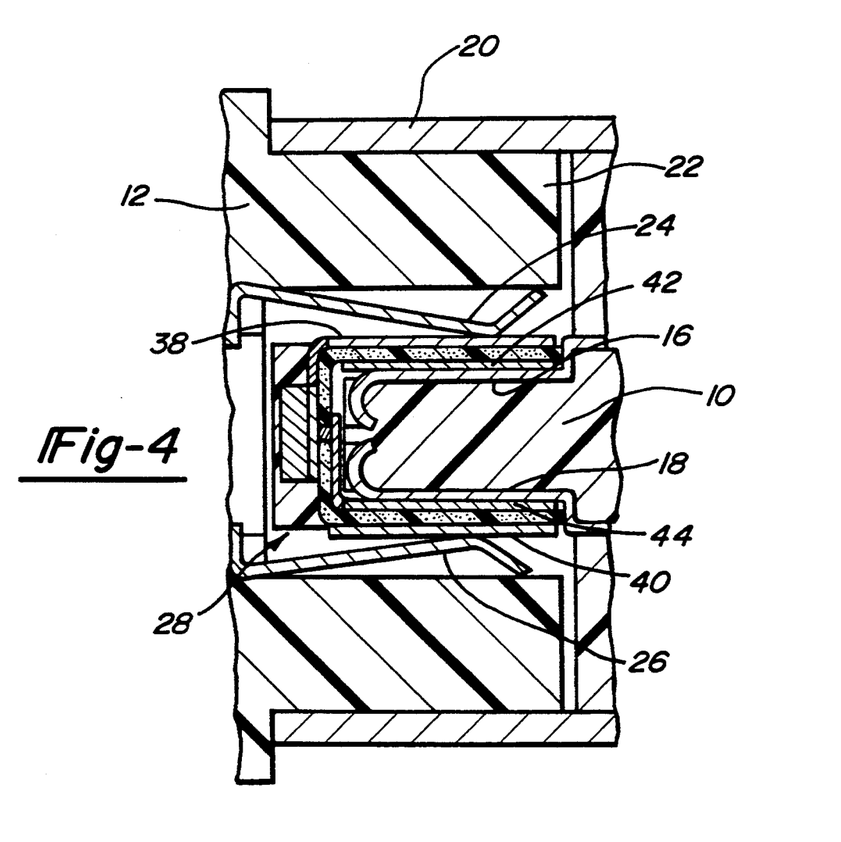
FIG. 4 is a cross sectional view showing the insert device sandwiched between two mated connectors.
Figure 5:
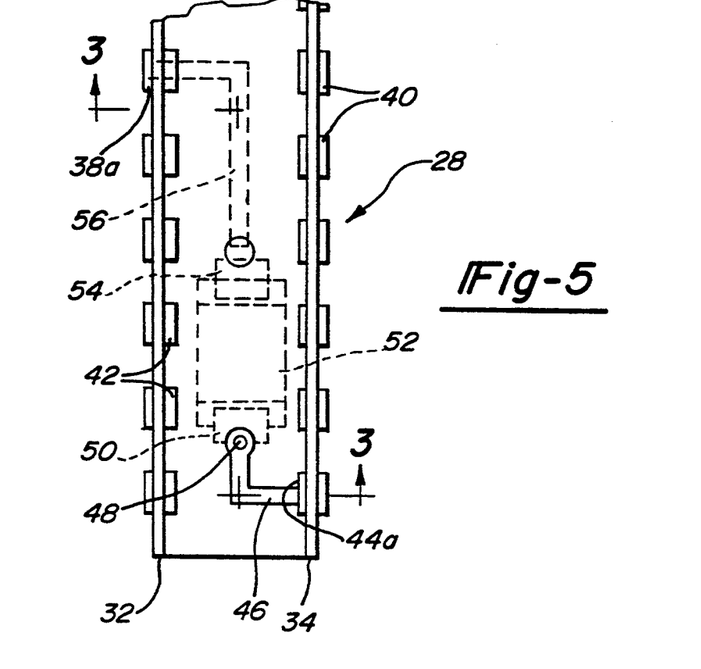
FIG. 5 is a bottom plan view as viewed from lines 5—5 towards the concave inner surface of the device of FIG. 2.

FIGS. 2-9 illustrate two embodiments of the conditioning insert 28. Both embodiments are essentially the same except for the location and type of circuit components included on the device. FIGS. 2-4 illustrate the conditioning insert 28 as including capacitors C, as well as resistors R, located on the outer surface 29 of the bridging portion 36 whereas the embodiment of FIG. 5 to 9 is specifically directed to the use of the conditioning insert device as a SCSI terminator 28' in which the resistive network is located on the inner side 31 of the device. Consequently, like reference numerals will be used to designate like components in both embodiments.

Device 28 is termed a conditioning insert device because it is inserted onto or between electrical connectors such as connectors 10 or 20 and the device "conditions" electrical signals flowing through the contacts in those connectors. The "conditioning" can be as simple as re-routing electrical signals between contact fingers in each connector or as sophisticated as including integrated circuit devices for reading, storing and transmitting data associated with these signals in the connectors.

The conditioning insert 28 includes an elongated U-shaped substrate 30. Substrate 30 is made of a thin, flexible insulating dielectric material such as a 0.005 to 0.015 inch thick sheet of Kapton. It is folded into the illustrated U-shape to define a pair of legs 32 and 34 separated by a bridging portion 36. The outer surface of leg 32 includes a series of conductive strips 38 which are aligned with the fingers 24 of connector 12. Likewiser outer surface of leg 34 includes a series of conductive strips 40 which are aligned with the fingers 26 of connector 12. The inner surface of leg 32 includes a similar row of conductive strips 42 which are aligned with the fingers 16 in connector 10. The inner surface of leg 34 includes a series of strip contacts 44 which are aligned with conductive fingers 18 of connector 10.

FIG. 2 illustrates a plurality of discrete components mounted to the substrate 30 such as capacitors C and resistors R. However, other components such as diodes, integrated circuits and the like could also be used depending on the application. These components are connected to selective contact strips on the legs by way of conductive traces and covered by protective covering 51. By way of an example, and by reference to FIGS. 3 and 5, conductive trace 46 extends from an upper portion of one of the contact strips 44 across part of bridging portion 36 to a plated through hole 48. Plated through hole 48 extends upwardly to the upper surface 29 of bridging portion 36 to a pad 50. A capacitor 52 is soldered between pad 50 and a similar pad 54 on upper surface 29. Pad 54 is coupled by way of trace 56 to a contact strip 38' on an outer surface of leg 32.

It is contemplated that the insert device 28 will commonly be used in the arrangement of FIG. 4 in which the insert 28 is sandwiched between mated connectors 10 and 12. In such manner, signals from one connector's finger contacts can be selectively re-routed to a finger contact on the mated connector through circuitry on the substrate. For example, signals on the one contact finger 18 of connector 10 abutting strip 44a are routed through capacitor 52 to contact strip 38a which, in turn, is connected to one finger 24 in connector 12. Of course, the insert 28 can be used in connection with only one electrical connector, if desired. For example, the insert device 28 can be slid over connector 10 and held in place by way of a friction fit with the insulator post 14 and surrounding contact fingers 16 and 18. In such case, there would be no need for the contact strips 38 and 40 on the outer surfaces of legs 32 and 34.

FIGS. 5-9 show a specific implementation of insert device as a SCSI terminator 28'.

Figure 6:
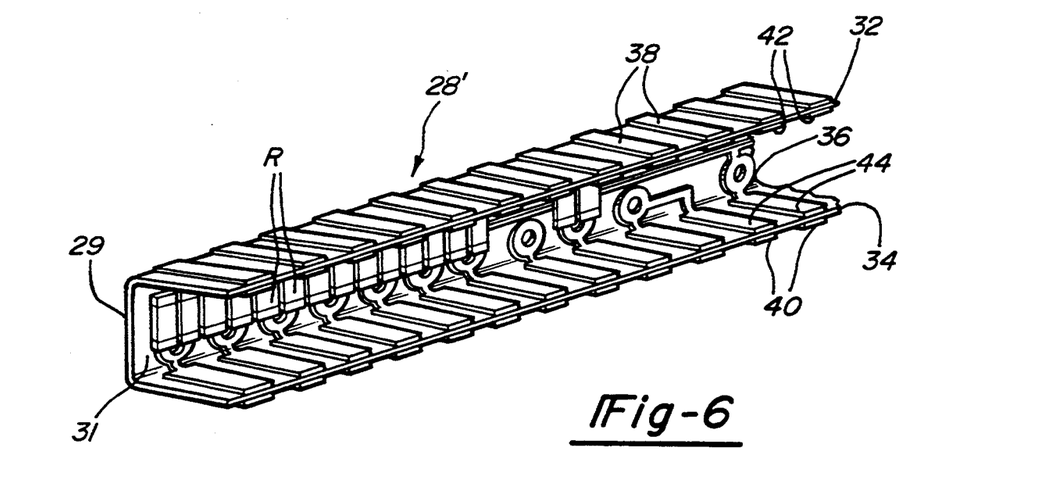
FIG. 6 is a perspective view of an alternative embodiment of the insert device which is specifically designed for use as a SCSI terminator.
Figure 7:
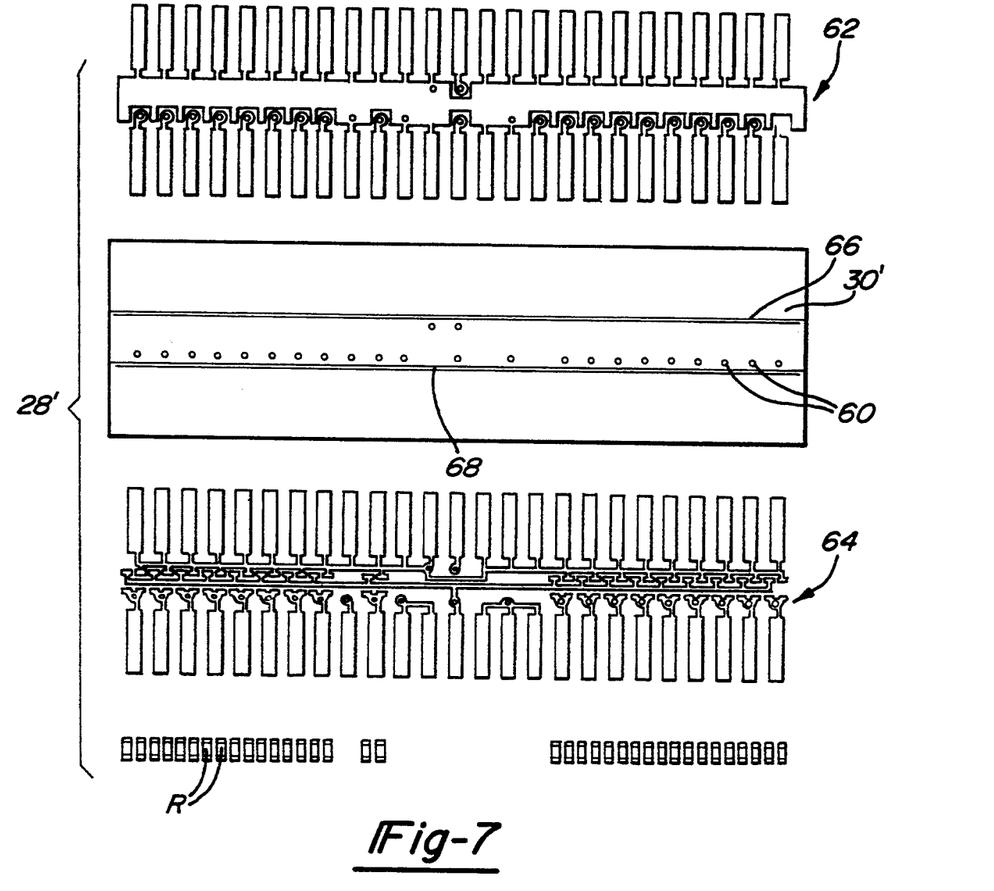
FIG. 7 is an exploded view of the SCSI insert device of FIG. 6.
Figure 8:
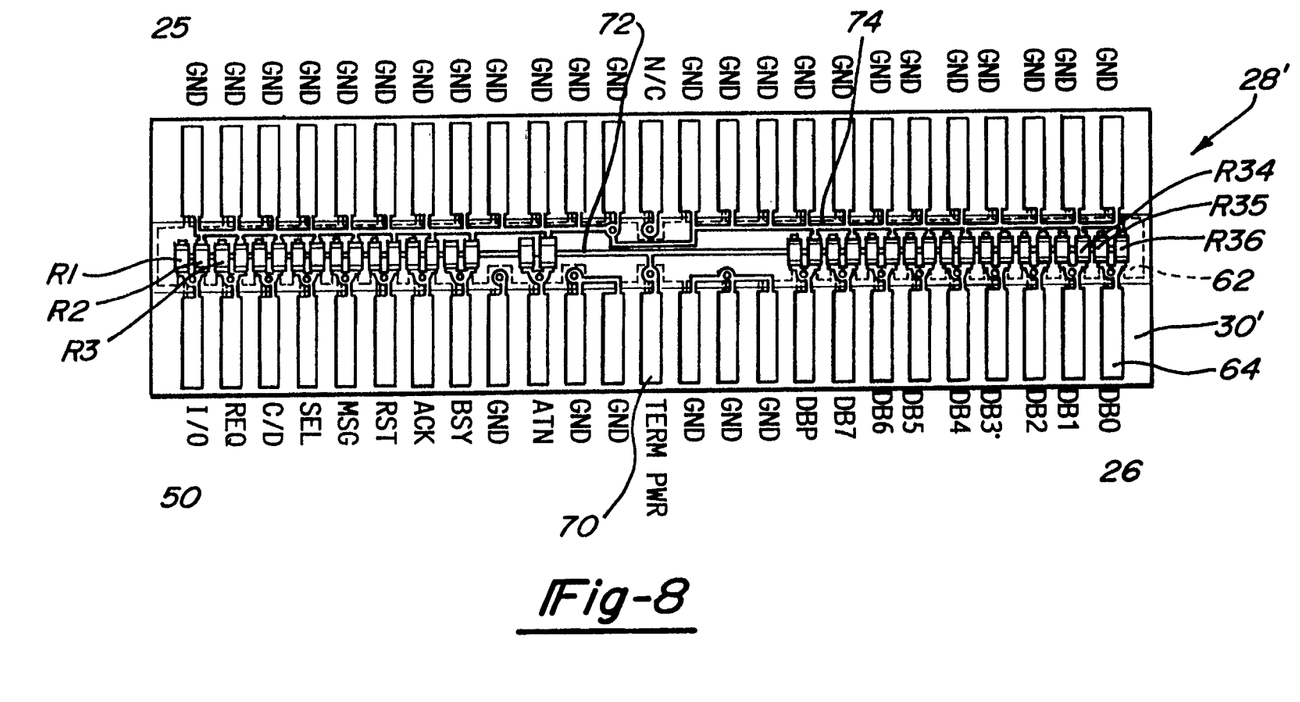
FIG. 8 is a top plan view of the assembled SCSI insert device viewed from the inner surface thereof before the legs are folded.
Figure 9:
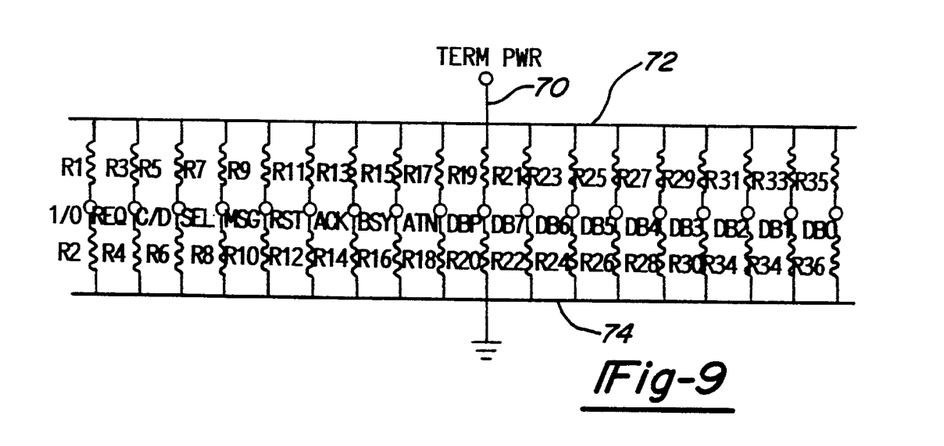
FIG. 9 is an electrical schematic diagram of the SCSI termination circuitry provided by the insert device.

FIG. 9 illustrates the electrical schematic diagram of a standard SCSI terminator circuit. FIGS. 6, 7 and 8 show the physical implementation of the SCSI terminator circuit, in accordance with the teachings of the present invention. Since the electrical schematic is well known, it need not be described in detail herein. FIG. 7 shows that there are three major layers of the SCSI terminator insert 28', plus a row of discrete resistor components. The middle layer 30' is the insulating substrate that has a plurality of holes 60 therein for receiving solder or the like to make up the plated through holes 48 previously discussed. The upper layer 62 is in the form of a pattern of conductive material such as copper. Similarly, the inner layer 64 is a copper conductive pattern. Preferably, the conductive patterns 62 and 64 are formed by way of standard photolithographic techniques where continuous layers on the substrate 30' are etched in the patterns depicted in the drawings. Thereafter, the discrete components are mounted to the substrate 30'. More specifically, in this embodiment, resistors R are soldered to pads on the inner layer 62 of the insert device 28' as seen most clearly in FIGS. 6 and 8. Solder or other conductive material is also added, in a known manner, to plate the holes 60 to thereby make electrical connection between the upper conductive pattern layer 62 and the lower conductive pattern layer 64 in selected areas. The upper and lower surfaces of the insert device 28 are then coated with a suitable protective covering layer, such as Kapton or an acrylic conformal coat, which is illustrated in a somewhat exaggerated manner at 51 in FIGS. 3 and 4.

Returning to FIGS. 6-9, after the device is coated, it is bent along fold lines 66 and 68 into the generally U-shaped configuration shown in FIG. 6. In this configuration, the terminator device 28' can be easily slipped onto the male connector 10 as illustrated in FIG. 4. In such manner, the inner contact strips 42 and 44 make electrical connection with the fingers 16 and 18 of connector 10. In some instances, as noted above, the insert device can perform its conditioning function without requiring the male connector 10 to be mated with a female connector. However, in the preferred embodiment, it is contemplated that the insert device 28' will be sandwiched between mated connectors as illustrated in FIG. 4. In this arrangement, the outer contact strips 38 and 40 of the insert device make electrical connection to the fingers 24 and 26 of the female connector 12. The layout of FIGS. 6 and 7 thus cooperate with the connectors 10 and 12 to form the SCSI terminator circuit of FIG. 9. A study of the drawings will illustrate how the physical connection is made. By way of one example, the inner contact strip 70 of FIG. 8 serves as the node labeled terminal power (TERMPWR) in FIG. 9. The contact strip 70 is connected to one side of resistor R1 (and also resistors R3, R5 ... R35) by way of a trace 72. The other side of resistor R1 is connected to the contact strip labeled I/O in FIG. 9 (which corresponds to node I/O in FIG. 8). The I/O contact strip is, in turn, connected to one side of resistor R2. The other side of resistor R2 is connected to trace 74 which is coupled to the contact strips labeled GND serving as electrical ground. Note that resistors R4, R6 ... R36 are likewise connected to the GND contact strips by way of trace 74. In view of this brief description, the remaining physical implementation of the SCSI terminator circuit should become apparent to those skilled in the art and, thus, further detail should not be necessary.

Those skilled in the art should now appreciate that the present invention offers a wide variety of advantages over signal conditioning techniques and, in particular, SCSI terminators. The conditioning insert device does not require any additional connectors to be used nor does it add any additional space requirements. It addition, the inventive technique does not degrade radio frequency shielding of network cables thereby improving network performance. All of these advantages can be obtained at relatively low cost. Still further advantages will become apparent to those skilled in the art after having the benefit of studying the specification and drawings and the claims that follow. For example, while a single layered structure has been illustrated, it is envisioned that multi-layered printed circuit board techniques can also be employed, if desired.

What is claimed is:

1. A device for use with a first electrical connector of the type having at least one row of finger contacts, said device comprising:
    an insulating substrate; at least one surface of the substrate having a series of contact strips thereon aligned with the fingers of the first connector; circuit means on the substrate and connected to at least one of the contact strips for conditioning electrical signals on the fingers of the first connector; and said substrate being removably insertable and configured to fit substantially upon a post of the first connector so that the contact strips engage the fingers of the first connector and such that a second connector may be mated with the first connector.

2. The device of claim 1 wherein:
    said first connector has two parallel rows of finger contacts;
    said substrate is generally U-shaped having a pair of legs spaced by a bridging portion;
    inner surfaces of the legs include a series of contact strips aligned with the fingers of the first connector;
    outer surfaces of the legs include a series of contact strips aligned with finger contacts in the second connector; and
    wherein the device fits between the first and second connectors when mated.

3. The device of claim 1 wherein said circuit means comprises at least one conductive trace on a surface of the substrate and connecting together at least two different contact strips.

4. The device of claim 3 wherein the substrate comprises a pair of legs each having inner and outer surfaces and wherein said circuit means further comprises at least one plated through hole connecting a contact strip on the inner surface of a leg to a contact strip on the outer surface of a leg.

5. The device of claim 4 wherein the substrate includes a bridging portion between the pair of legs and wherein said circuit means further comprises at least one electrical component mounted to the bridging portion of the substrate.

6. The device of claim 1 wherein said circuit means comprises an array of resistors and circuit traces connected between the contact strips to form a small computer system interface (SCSI) terminator circuit.

7. The device of claim 1 wherein:
    said first connector has two parallel rows of finger contacts; said substrate has first and second major surfaces, said circuit means is located on at least one of the major surfaces, the series of contact strips on the substrate are aligned with at least one of the rows of finger contacts of the first connector such that the contact strips engage the finger contacts when the first connector is mated with the second connector.

8. A small computer system interface (SCSI) terminator device for sandwiching between first and second mated connectors, the first connector having an elongated insulating post with a series of conductive fingers along upper and lower surfaces of the post, the second connector having an annular insulating mouth portion defining a cavity, with a series of conductive fingers lining upper and lower inner walls of the mouth portion, said SCSI terminator device comprising:
    a generally U-shaped insulating substrate having a pair of legs spaced by a bridging portion, inner surfaces of the legs having a series of contact strips thereon aligned with the fingers on the first connector, outer surfaces of the legs having a second series of contact strips aligned with the fingers of the second connector; and
    circuit means on the substrate and connected to selected contact strips for defining a SCSI termination circuit when the device is inserted between the two mated connectors, with the contact strips on the device making electrical connection to the fingers on the connectors.

9. The device of claim 8 wherein said circuit means comprises a plurality of discrete resistors mounted to the bridging portion of the substrate and connected to selected contact strips.

10. The device of claim 9 wherein the resistors are mounted on an inner side of the bridging portion of the substrate.

11. The device of claim 10 wherein the substrate is a flexible dielectric layer.

12. The device of claim 11 wherein the circuit means further comprises:
    at least one plated through hole connecting selected contact strips on the inner legs to selected contact strips on the outer legs.

13. The device of claim 10 which is formed from essentially three layers, an outer metallic layer defining at least the contact strips for the outer legs, a middle flexible dielectric layer having a plurality of holes therethrough, and an inner metallic layer defining the contact strips for the inner legs of the device and including metallic traces on the bridging portion of the substrate for connecting a plurality of components thereto.

14. A device for conditioning electrical signals flowing between two mated connectors, the first connector having an elongated insulating post with a series of conductive fingers along upper and lower surfaces of the post, the second connector having an annular insulating mouth portion defining a cavity, with a series of conductive fingers lining upper and lower inner walls of the mouth portion, said device comprising:
  a flexible U-shaped dielectric substrate having a pair of legs spaced by a bridging portion, inner surfaces of the legs having a series of contact strips thereon aligned with fingers on the first connector, outer surfaces of the legs having a second series of contact strips thereon aligned with the fingers of the second connector, circuit means on the substrate and connected to selected contact strips for conditioning electrical signals flowing between the two connectors, the substrate being sufficiently thin so that it can be sandwiched between the two connectors when normally mated together, the circuit means including a plurality of conductive traces on inner and outer surfaces of the substrate, at least one electrical component being mounted to the substrate and electrically connected to at least one trace, the circuit means further including a plated through hole for making electrical connection between traces on an inner surface of the substrate to traces on an outer surface of the substrate.

15. The device of claim 14 wherein the circuit means comprises a small computer system interface (SCSI) terminator circuit.

16. A computer network system comprising:
  a network cable connected to a computer, said network cable having a first connector with an elongated insulating post having a series of conductive fingers along upper and lower surfaces of the post;
  a computer peripheral device having a second connector thereon, said second connector having an annular insulating mouth portion defining a cavity, with a series of conductive fingers lining upper and lower inner walls of the mouth portion; and
  a small computer system interface (SCSI) device sandwiched between the two connectors for providing a SCSI termination circuit while the connectors are mated together.

17. The system of claim 16 wherein said SCSI device comprises:
  a generally U-shaped insulating substrate having a pair of legs spaced by a bridging portion, inner surfaces of the legs having a series of contact strips thereon aligned with the fingers on the first connector, outer surfaces of the legs having a second series of contact strips aligned with the fingers of the second connector, with the contact strips on the device making electrical connection to the fingers on the connectors and circuit means on the substrate for defining the SCSI termination circuit.

18. The computer network system of claim 16 wherein said SCSI device comprises:
  an insulating substrate;
  at least one surface of the substrate having a series of contact strips thereon aligned with the fingers of the first connector;
  circuit means on the substrate and connected to at least one of the contact strips for conditioning electrical signals on the fingers of the first connector; and
  said substrate is removably insertable between the first and the second connectors such that the contact strips engage the fingers of the first connector while permitting substantially normal mating engagement between the first and the second connectors.

19. The computer network system of claim 16 wherein said SCSI device comprises:
  an insulating substrate;
  at least one surface of the substrate having a series of contact strips thereon aligned with the fingers of the second connector;
  circuit means on the substrate and connected to at least one of the contact strips for conditioning electrical signals on the fingers of the second connector; and
  said substrate being removably insertable and configured to fit substantially within the cavity of the second connector such that the contact strips engage the fingers of the second connector while permitting substantially normal mating engagement between the first and second connectors.

20. A device for use with a first electrical connector of the type having a cavity and two parallel rows of finger contacts, said device comprising:
  an insulating substrate having first and second major surfaces; at least one surface of the substrate having a series of contact strips thereon aligned with at least one of the rows of finger contacts of the first connector; circuit means on at least one of the major surfaces and connected to at least one of the contact strips for conditioning electrical signals on the fingers of the first connector; said substrate being removably insertable and configured to fit substantially within the cavity of the first connector such that the contact strips engage the fingers of the first connector and such that a second connector may be mated with the first connector; and
  wherein the device fits unobtrusively between the first and second connectors when mated.

21. A device for use with a first electrical connector of the type having a cavity and two parallel rows of finger contacts, said device comprising:
  an insulating substrate being generally U-shaped and having a pair of legs spaced by a bridging portion;
  inner surfaces of the legs include a series of contact strips aligned with finger contacts of a second connector;
  outer surfaces of the legs include a series of contact strips aligned with the fingers in the first connector;
  circuit means on the substrate and connected to at least one of the contact strips for conditioning electrical signals on the fingers of at least one of the connectors; and
  said substrate being removably insertable and configured to fit substantially within the cavity of the first connector such that the contact strips engage the fingers of the first connector and such that the second connector may be mated with the first connector.

22. A device for use with a first electrical connector of the type having a cavity and at least one row of finger contacts, said device comprising:
  an insulating substrate including a pair of legs each having inner and outer surfaces;
  at least one surface of the substrate having a series of contact strips thereon aligned with the fingers of the first connector;
  circuit means on the substrate and connected to at least one of the contact strips for conditioning electrical signals on the fingers of the first connector, said circuit means includes at least one conductive trace on a surface of the substrate connecting together at least two different contact strips and at least one plated through hole connecting a contact strip on the inner surface of a leg to a contact strip on the outer surface of a leg; and said substrate being removably insertable and configured to fit substantially within the cavity of the first connector such that the contact strips engage the fingers of the first connector and such that a second connector may be mated with the first connector.

23. The device of claim 22 wherein the substrate includes a bridging portion between the pair of legs and said circuit means further includes at least one electrical component mounted to the bridging portion of the substrate.

24. A device for use with a first electrical connector of the type having a cavity and at least one row of finger contacts, said device comprising:

an insulating substrate;

at least one surface of the substrate having a series of contact strips thereon aligned with the fingers of the first connector;

circuit means on the substrate and connected to at least one of the contact strips for conditioning electrical signals on the fingers of the first connector, said circuit means includes an array of resistors and circuit traces connected between the contact strips to form a small computer system interface (SCSI) terminator circuit; and said substrate being removably insertable and configured to fit substantially within the cavity of the first connector such that the contact strips engage the fingers of the first connector and such that a second connector may be mated with the first connector.

* * * * *